I. M. GRAHAM.
POULTRY FEEDING DEVICE.
APPLICATION FILED APR. 4, 1914.
1,128,971.
Patented Feb. 16, 1915.
2 SHEETS—SHEET 1.
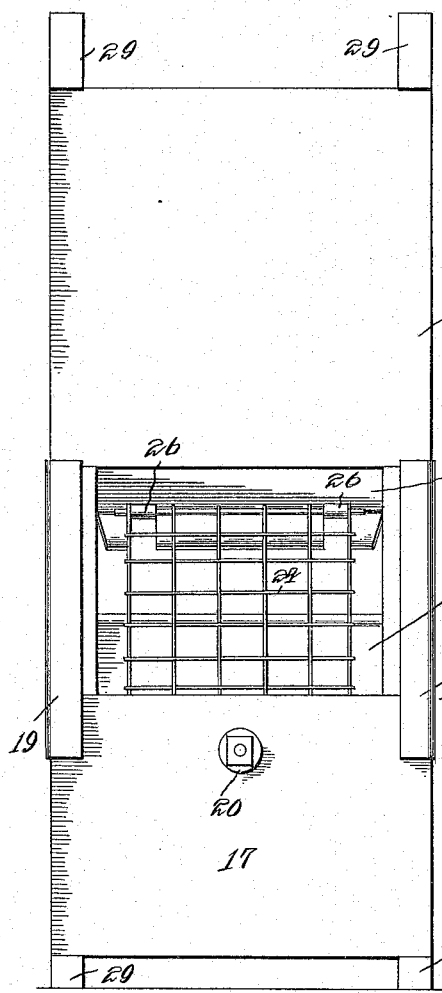
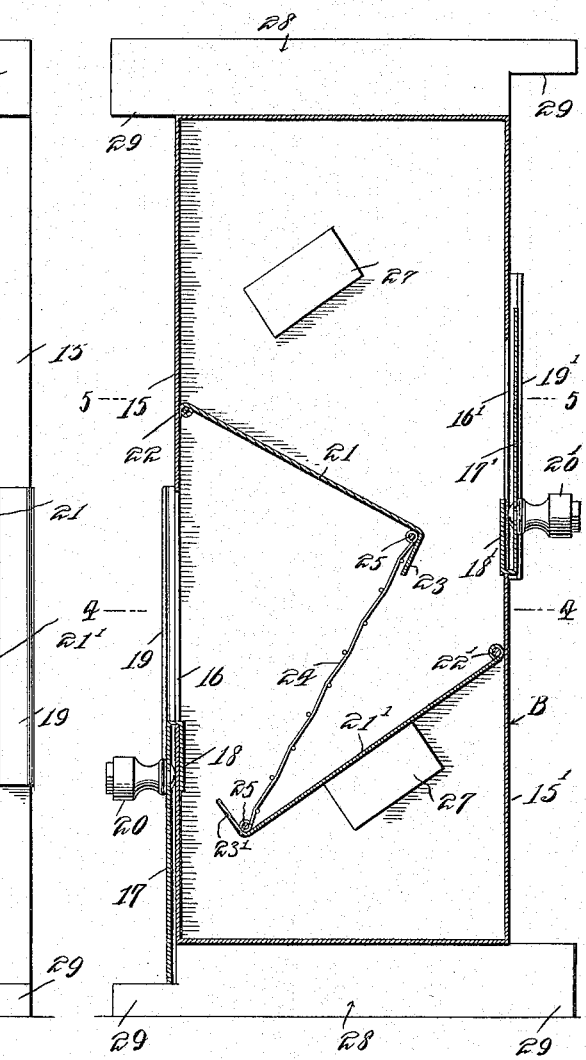

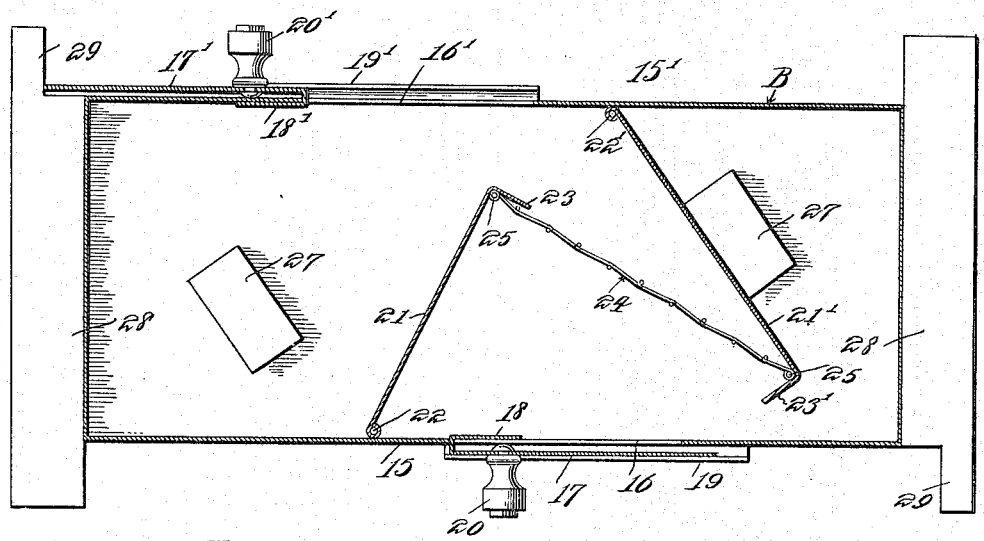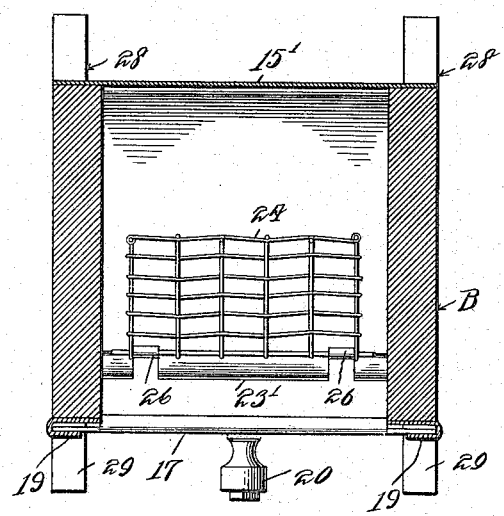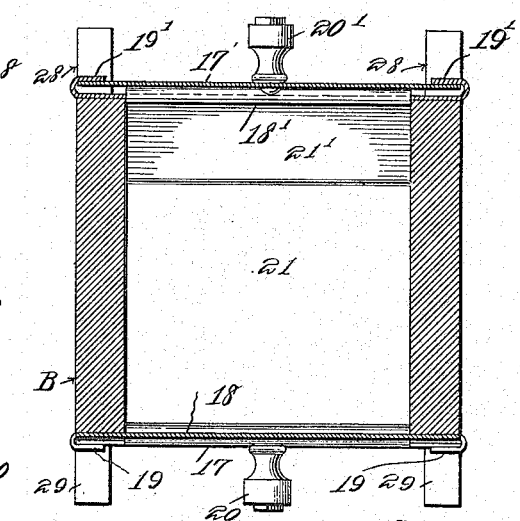

UNITED STATES PATENT OFFICE.

IRVING M. GRAHAM, OF CANDIA, NEW HAMPSHIRE.

POULTRY-FEEDING DEVICE.

1,128,971. Specification of Letters Patent. Patented Feb. 16, 1915.

Application filed April 4, 1914. Serial No. 829,605.

*To all whom it may concern:*

Be it known that I, IRVING M. GRAHAM, a citizen of the United States, residing at Candia, in the county of Rockingham and State of New Hampshire, have invented new and useful Improvements in Poultry-Feeding Devices, of which the following is a specification.

This invention relates to poultry feeding devices, and it has for its object to provide a simple and efficient feed box having tiltable partitions and two end compartments one of which may be filled with food which, when the box is upended, will gravitate over the partition members to an accessible position.

A further object of the invention is to produce a feed box having two end compartments, one of which constitutes a hopper or receptacle, while the other end compartment constitutes a receptacle for overflowing food which might otherwise be wasted.

A further object of the invention is to provide a reversible feed box having a feed receptacle and a waste receptacle, said feed and waste receptacles being interchangeable by inverting the box.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a front view of the improved feeding device. Fig. 2 is a vertical sectional view taken on the line 2—2 in Fig. 1. Fig. 3 is a vertical sectional view, showing the device in position for filling. Fig. 4 is a sectional view taken on the line 4—4 in Fig. 2. Fig. 5 is a sectional view taken on the line 5—5 in Fig. 2.

Corresponding parts in the several figures are denoted by like characters of reference.

The improved feeding device consists of a box B preferably of rectangular shape, said box having front and rear walls 15, 15′, each having a door opening 16, 16′ for which sliding doors 17, 17′ are provided, said doors being arranged to gravitate, respectively, to an open and to a closed position when the box is upended in position for operation, as seen in Figs. 1 and 2. Each door has a flange 18, 18′ to support it in its open position by engagement with an edge of the door opening, as clearly seen in Fig. 2. Guideways 19, 19′ are provided for the respective doors, and each door has a handle 20, 20′.

The box or receptacle is provided with hingedly supported partition plates 21, 21′, the same being mounted on hinge rods or supports 22, 22′ adjacent to the respective wall members 15, 15′. The free edges of the partition members are provided with upturned flanges 23, 23′. 24 is a connecting member made of wire netting of suitable mesh, said connecting member being provided at the ends thereof with reinforcing rods 25 which are located adjacent to the respective flanges 23, 23′ and secured by means of tongues 26, struck up from the said flanges and folded over the respective rods 25. In this manner the two hinged partition members 21, 21′ are connected together to operate in unison. Stops 27 are disposed on the side walls of the box to limit the movement of the respective partition members 21, 21′.

The two ends of the box are provided with cleats 28 which are extended terminally to form legs 29. The cleats 28 form supports whereby the box is raised above the ground when it is upended to its operative position, as seen in Figs. 1 and 2. The legs 29 support the box when tilted into position for filling, as seen in Fig. 3.

When the box is in position, as shown in Fig. 3, one of the slides which is now on top may be opened and the compartment between one partition and the end of the box adjacent to such partition may be filled. After closing the door or slide the box is upended, and the opposite door will now gravitate to an open position, as seen in Fig. 1, while the food will gravitate over the partition on which it rests on to the other partition member which is oppositely inclined, the upturned flange of the last mentioned partition member serving to stop or arrest the downward movement of the feed which is also somewhat checked by the wire mesh member 24, the latter being of sufficiently coarse mesh to permit the fowls to have access to the feed therethrough. Any overflow or leakage of feed will gravitate into the compartment between the bottom end member and the adjacent partition member. When the top compartment is empty, the box is tilted to a position similar to that seen in Fig. 3, but with the difference that it is turned upside down from the tilted position previously occupied. The top door is now opened, and feed may be added to that which has overflowed into the end compartment now exposed, after which the door is closed and the box upended for operation, as before.

It will be observed that I have provided a feed box of extremely simple construction in which the feed will gravitate from either end in the direction of the other end, when the box is upended, the front and rear walls being provided with doors, one of which will gravitate to an open and the other to a closed position to make the contents accessible. The overflow will gravitate into a waste compartment from which, by inverting the box it will again gravitate to a position which is accessible to the fowls. In this manner it will be impossible for any portion of the feed to become sour or stale, and the feed may be used without possibility of waste.

Having thus described the invention, what is claimed as new, is:—

1. A reversible feeding device comprising a box having opposite walls provided with door openings and doors for the same, hingedly supported partition members adjacent to said walls, and means for limiting the movement of the partition members.

2. A reversible feeding device comprising a box having opposite walls provided with door openings and doors therefor, and hingedly supported partition members adjacent to said walls.

3. A reversible feeding device comprising a box having opposite walls provided with door openings and doors therefor, hinged partition members adjacent to said walls, and a wire mesh connecting member connected with the partition members adjacent to the free edges thereof.

4. In a reversible feeding device, a box having opposite walls provided with door openings and slide doors to obstruct the same, said doors being arranged to gravitate respectively to an open and to a closed position when the box is upended.

5. In a reversible feeding device, a box having opposite walls provided with door openings and slide doors to obstruct the same, said doors being arranged to gravitate respectively to an open and to a closed position when the box is upended, hingedly supported partition members adjacent to said walls, and a mesh member connecting the free edges of the partition members.

6. In a reversible feeding device, a box having opposite walls provided with door openings and slide doors to obstruct the same, said doors being arranged to gravitate respectively to an open and to a closed position when the box is upended, said partition members having upturned flanges at their free edges.

7. In a reversible feeding device, a box having opposite walls provided with door openings and doors therefor, partition members supported hingedly adjacent to said walls and having upturned free edges provided with struck up tongues, and a connecting member of wire mesh having reinforcing rods secured by said tongues.

8. In a reversible feeding device, a box having opposite walls provided with door openings and doors therefor, partition members supported hingedly adjacent to said walls and having upturned free edges provided with struck up tongues, and a connecting member of wire mesh having reinforcing rods secured by said tongues; the side members of the box being provided with stop members in the path of the partition members.

9. A reversible feeding device comprising a box having opposite walls provided with door openings and doors therefor, hingedly supported partition members within the box, means connecting the free ends of the partition members so that the said partition members will operate in unison, and stop members in the path of the partition members.

10. In a reversible feeding device, a box structure having door openings in opposite walls and doors for said openings, said box being provided at the two ends thereof with supporting cleats extended beyond the opposite walls having door openings to form legs to support the box above the ground when tilted and also when upended.

11. In a feeding device, a box having a hopper compartment, an intermediate member over which material is fed from the hopper compartment, and whereon said material is exposed for feeding purposes, and a waste compartment to receive the overflow from the intermediate member.

12. In a feeding device, a box structure having a hopper compartment, an intermediate inclined member over which material is guided from the hopper compartment, and whereon said material is exposed for feeding purposes, a mesh screen connected with and spaced from the inclined member, and a waste compartment to receive the overflow from the inclined member.

In testimony whereof I affix my signature in presence of two witnesses.

IRVING M. GRAHAM.

Witnesses:
 LUTHER M. PIKE,
 EDWIN A. SMITH.

Copies of this patent may be obtained for five cents each, by addressing the "Commissioner of Patents, Washington, D. C."